United States Patent [19]

Clikeman

[11] Patent Number: 5,374,686
[45] Date of Patent: Dec. 20, 1994

[54] PROCESS FOR SEGMENTED COPOLYMERS

[75] Inventor: Richard R. Clikeman, Washington Crossing, Pa.

[73] Assignee: Rohm and Haas Company, Philadelphia, Pa.

[21] Appl. No.: 221,112

[22] Filed: Mar. 31, 1994

Related U.S. Application Data

[63] Continuation-in-part of Ser. No. 87,243, Jul. 2, 1993, abandoned.

[51] Int. Cl.$^5$ .............................. C08F 2/06; C08F 2/10
[52] U.S. Cl. .................................... 525/298; 525/301; 525/308; 525/309; 525/310
[58] Field of Search ................ 525/298, 301, 308, 309, 525/310

[56] References Cited

U.S. PATENT DOCUMENTS

| | | | |
|---|---|---|---|
| 3,652,730 | 3/1972 | Favie et al. | 525/259 |
| 4,080,405 | 3/1978 | Agouri et al. | 525/260 |
| 4,097,554 | 6/1978 | Yui et al. | 525/13 |
| 4,370,450 | 1/1983 | Grigo et al. | 525/262 |
| 4,757,111 | 7/1988 | Hirai et al. | 525/309 |
| 4,957,974 | 9/1990 | Ilenda | 525/301 |
| 5,247,024 | 9/1993 | Natoli et al. | 525/298 |

FOREIGN PATENT DOCUMENTS

| | | |
|---|---|---|
| 437808 | 12/1990 | European Pat. Off. . |
| 492346 | 1/1974 | Japan . |
| 229086 | 6/1990 | Japan . |
| 3273014 | 12/1991 | Japan . |
| 1312325 | 10/1969 | United Kingdom . |

*Primary Examiner*—James J. Seidleck
*Assistant Examiner*—I. Zemel
*Attorney, Agent, or Firm*—Roger K. Graham

[57] ABSTRACT

An improved aqueous slurry process (with co-solvent) for the preparation of segmented copolymers of polyolefins and poly((meth)acrylates) is disclosed.

15 Claims, No Drawings

19,374,686

PROCESS FOR SEGMENTED COPOLYMERS

This application is a continuation-in-part of U.S. application Ser. No. 08/87,243, filed Jul. 2, 1993, now abandoned.

BACKGROUND OF THE INVENTION

1. Field of the Invention

It has recently been shown by Ilenda et al., in U.S. Pat. No. 4,957,974, incorporated herein by reference, that segmented copolymers, such as graft copolymers, of polyolefins, such as polypropylene, within a specific molecular weight range, and of polymethacrylates within a certain composition and molecular weight range, are useful additives for polyolefins for imparting melt strength. Such segmented copolymers are also useful for the compatibilization of polyolefins and polar polymers. An improved process for the manufacture of these segmented copolymers has been sought to lower cost of manufacture and to yield the product in a more suitable particulate form free of agglomerates and fines.

2. Description of the Prior Art

The term "segmented copolymer" refers to polymers wherein at least one segment of polymer A is chemically joined to at least one segment of different polymer B, and encompasses block copolymers, where the segments are joined at at least one end of the segments, and also graft copolymers, where there may be a trunk of polymer A to which at least one segment of polymer B is attached at a site on the trunk which is not at the end. Because it is difficult cleanly to separate and analyze polymers where a vinyl monomer such as styrene or methyl methacrylate is polymerized in the presence of a crystalline polyolefin, such as polypropylene, and because the possibility exists for both block and graft copolymers to be formed, we have chosen to use the inclusive term "segmented copolymers".

The prior art discloses many grafted polymers from vinyl monomers onto pre-formed polyolefins, which art is noted in the Natoli et al. application discussed below. The prior art further discloses many technologies to prepare segmented copolymers, especially by the polymerization of vinyl monomers in the presence of pre-formed polyolefins, such as in solution, in emulsion, in a solvent-swollen aqueous dispersion, and in an aqueous dispersion without a solvent. Again, relatively few of these references relate to aqueous-related processes wherein the vinyl monomer is an ester of a lower alkyl (meth)acrylate, and none disclose the specific polymers with high molecular weight grafted chains as taught by Ilenda et al. The methods disclosed for the polymerization of methacrylate ester monomers, such as methyl methacrylate, in the presence of a crystalline polymer, such as polypropylene, utilize methods which require a period of contact between the polymer and the monomer to be polymerized, which may further require the use of a solvent. The art does not teach a rapid method for conducting the polymerization, and such a rapid method is desirable for commercial production.

A major difficulty with such rapid methods is achieving penetration of the crystalline polymer particle by the monomer, which is best effected by a co-solvent which is essentially inert to the free-radical polymerization process, and further by the use of the polyolefin in the front of flakes, pellets, or porous spherical particles. An advantage of the present process is that it is as effective in producing acceptable segmented copolymer, of good appearance and physical properties, with less expensive pellets as with the more expensive porous particles. A second major difficulty is the tendency of the polyolefin to agglomerate or clump together upon contact with the monomer/solvent mixture during the initial stages of polymerization. Dispersing agents have been taught for the older processes known to the art, but these are ineffective in the present process.

One method involving a "slurry" polymerization of polypropylene in an aqueous media with methyl methacrylate or other methacrylate-rich monomer mixtures, appropriate organic solvents for the methacrylate monomer, and selected dispersing agents has been revealed in Natoli and Chang, U.S. application Ser. No. 898,979, filed Jun. 15, 1992, allowed, and incorporated by reference. This method has proven to be an effective means of manufacture. However, it suffers from certain process deficiencies such as agglomeration of the particulate structures when higher solids levels are attempted or when the second segment (the segment derived front at least 50 weight percent of an alkyl (meth)acrylate) is a polymer which softens at a lower temperature than poly(methyl methacrylate).

Thus, the art does not teach how to accomplish the desirable goal of a rapid process for forming in an aqueous medium at high solids without agglomeration the graft copolymers of the compositions discovered by Ilenda et al. The process is further useful for preparing related segmented copolymers wherein the molecular weight of one or more segments is lower than or higher than that taught by Ilenda et al. or where the composition of the (meth)acrylate group differs somewhat in composition from that taught by Ilenda et al.

SUMMARY OF THE INVENTION

In the following text, (meth)acrylate ester refers to an ester of acrylic acid or methacrylic acid, and (meth)acrylic acid refers to acrylic acid or methacrylic acid.

We have discovered a process for preparation of a segmented copolymer of (A) a polyolefin, preferably (i) propylene homopolymer, (ii) a copolymer containing more than 90 percent by weight of units derived front propylene, (iii) ethylene homopolymer, or (iv) a copolymer containing more than 90 percent of units derived from polyethylene, and (B) of a polymer comprised of greater than about 50 weight percent, preferably more than about 80 weight percent, of units derived from at least one alkyl (meth)acrylate, preferably methyl methacrylate, comprising:

a) preparing a slurry of about 100 parts of particles of polyolefin of average particle size below about 6 mm. with
    1. from about 100 to about 500 parts of water;
    2. from about 0.1 to about 5 parts of at least one dispersant, the at least one dispersant maintaining the polyolefin particles in particulate form, the at least one dispersant being chosen from polymers which are copolymers of units derived from (n-meth)acrylic esters and at least one of units derived from a partially or totally neutralized copolymerizable unsaturated acid;
  b) heating the slurry in a pressure vessel with agitation until a temperature of at least about 60° C., preferably at least about 75 ° C., is obtained;
  c) prior to or during said heating adding to the slurry from about 0 to about 100 parts, preferably to about 60 parts, more preferably to below 60 parts, of one or more organic solvents, miscible with the later-added first monomer mixture;

d) adding to the heated slurry either separately or in combination
1. from about 5 to about 120 parts of a first monomer mixture which is greater than 50% by weight of at least one alkyl (meth)acrylate;
2. from about 0.01 to about 2 parts of at least one polymerization initiator;
3. one or more organic solvents, miscible with the first monomer mixture so that the total of solvent added in steps (c) and (d) is from about 5 to about 100 parts, preferably to about 60 parts, more preferably for best agglomeration control from 10 to 20 parts, of solvent; p1 e) continuing heating to maintain the reaction temperature at at least 60° C., preferably at least about 75° C., for at least about 30 minutes;

f) heating the reaction mixture to a temperature at least above 115° C. and above the softening point of the polyolefin particles;

g) further adding to the reaction vessel
1. from about 5 to about 200 parts of a second monomer mixture which is greater than 50% by weight of at least one alkyl (meth)acrylate;
2. from about 5 to about 150 parts of at least one organic solvent, miscible with the second monomer mixture;
3. from about 0.01 to about 2 parts of at least one polymerization initiator;

h) holding the reaction vessel at a temperature above 115° C. and above the softening point of the polyolefin particles until essentially complete conversion of the monomers to polymer occurs, the polymer being formed being at least partially grafted to the polyolefin to form the segmented copolymer, the segmented copolymer remaining in particulate form.

The segmented polymer for use in its various applications may be converted to free flowing dry particles by the following operations, conducted in either sequence of (i) followed by (ii) or (ii) followed by (i), or the two sequences combined:
i) separating the solvent from the segmented copolymer particles;
ii) separating any remaining water from the particulate segmented copolymer particles.

I have further discovered a related process for preparing a segmented copolymer of a polyolefin and of a polymer comprised of greater than about 50 weight percent of units derived from at least one alkyl (meth)acrylate, comprising:

a) preparing a slurry of about 100 parts of particles of polyolefin of average particle size below about 6 mm. with
1. from about 100 to about 500 parts of water;
2. from about 0.1 to about 5 parts of at least one dispersant, the at least one dispersant maintaining the polyolefin particles in particulate form, the at least one dispersant being chosen from polymers which are copolymers of units derived from (meth)acrylic esters and at least one of units derived from a partially or totally neutralized copolymerizable unsaturated acid;

b) heating the slurry in a pressure vessel with agitation until a temperature of at least about 60° C., preferably at least about 75° C., is obtained;

c) prior to or during said heating adding to the slurry from about 0 to about 100 parts, preferably to about 60 parts, of one or more organic solvents, miscible with the later-added first monomer mixture;

d) adding to the heated slurry either separately or in combination
1. frown about 5 to about 120 parts of a first monomer mixture which is greater than 50% by weight of at least one alkyl (meth)acrylate;
2. from about 0.01 to about 2 parts of at least one polymerization initiator;
3. one or more organic solvents miscible with the first monomer mixture, so that the total of solvent added in steps (c) and (d) is from about 5 to about 100 parts, preferably about 60 parts, of solvent;

e) continuing heating to maintain the reaction temperature at at least 60° C., preferably at least 75° C., until essentially complete conversion of the monomers to polymer occurs, the polymer being formed being at least partially grafted to the polyolefin to form the segmented copolymer, the segmented copolymer retaining in particulate form.

The segmented polymer for use in its various applications may be converted to free flowing dry particles by the following operations, conducted in either sequence of (i) followed by (ii) or (ii) followed by (i), or the two sequences combined:
i) separating the solvent from the segmented copolymer particles;
ii) separating any remaining water from the particulate segmented copolymer particles.

I have further found that a useful variation of the present invention is to utilize a non-volatile solvent, wherein the non-volatile solvent is not separated from the particulate segmented copolymer particles during or after separation from the water. By non-volatile is meant a solvent which will not "bleed" from or evaporate from or deposit from a polyolefin or other thermoplastic modified with the segmented copolymer made by this process. This involves a solvent whose boiling point is quite high, above at least 300° C. The solvent preferably is one which has a polyolefin-soluble portion and a portion which will contain the methyl methacrylate monomer and polymer. Utilization of test conditions similar to the reaction conditions described herein can readily determine whether the non-volatile solvent is compatible with or dissolves in the polyolefin of choice, is miscible with the monomer mixture, and compatible with or dissolves in the polymethacrylate. Solvents of choice include glycerol monostearate, glycerol distearate, oleic acid or hydrogenated soybean oil.

These non-volatile solvents may be liquids or may be solids which will become molten and the reaction temperature. In the latter case, it is preferable to admix the non-volatile solvent in molten form, and more preferable to admix the non-volatile solvent with the monomer and then emulsify it, such as with an alkali metal soap, such as potassium oleate, sodium stearate, and the like. The pH of the reaction mixture must be controlled carefully so as to establish an appropriate equilibrium between emulsifier, dispersant, and any acid or base present; the dispersant must remain at the particle surface (to prevent agglomeration), and the emulsifier converted to a non-emulsifier (to aid in transfer of the monomer and non-volatile solvent to the polyolefin particles). In the case of potassium oleate emulsifier, a reaction pH maintained between 4.0 and 4.75 is preferred.

If desired, the non-volatile solvent may be removed by extraction with a low-boiling solvent (which may also remove ungrafted methacrylic polymer, such as when acetone is used) or (if the non-volatile solvent is oleic acid, such may be extracted by an alkaline wash).

The process is further useful for the preparation of segmented copolymers with segments of high molecular weight, such as wherein the polyolefin is a non-polar polyolefin selected from the group consisting of polyethylene, polypropylene, polybutylene, poly(4-methylpentene), copolymers of these olefins with each other and with small amounts (less than about 10%) of other olefins and/or non-conjugated diolefins, such as octene, hexene, ethylidenenorbornene, 1,4-hexadiene and the like, copolymers of olefins with minor amounts of vinyl esters, vinyl chloride, (meth)acrylic ester and (meth)acrylic acid, the polyolefin having a molecular-weight of frown about 50,000 to about 1,000,000, and wherein the alkyl meth)acrylate polymer formed has a molecular weight of from about 20,000 to about 200,000. Also included are so-called EPDM polymers, which are amorphous terpolymers of ethylene, propylene, and a "diene monomer" which is a non-conjugated olefin with two double bonds of differing reactivity, so that a residual double bond is maintained after formation of the terpolymer. Further, by adjustment of the choice of starting polyolefin molecular weight and of reaction conditions, including amount of initiator, the process is useful for the preparation of segmented copolymers with molecular weights outside the range described above.

It is believed that the process advantages, especially avoidance of agglomeration, occur because the first polymer formed is mainly at or near the surface of the polyolefin particle, forming a harder and much more polar surface which is both more resistant to agglomeration at the lower first reaction temperature, and also more readily swollen by the remaining (meth)acrylate monomer. This polymerization at or near the surface also allows the reaction mixture to be heated to well above the softening point of the polyolefin resin without agglomeration or particle breakdown.

The invention contemplates either addition of some solvent while heating the slurry to the first reaction temperature, then adding more solvent with the first monomer, but it also contemplates no addition of solvent prior to addition of the first monomer. Monomer, solvent, and initiator may be admixed or fed in separate streams.

The invention further contemplates adding the monomer in one or two (or more) separate sequences, and of course the amount of monomer in the two additions will have to be balanced to achieve the desired overall composition. The first and second monomer feeds need not be of the same composition. A two-step process is preferred, for overall rapidity in completing the polymerization.

The methacrylate polymer formed may contain up to about 50%, preferably up to about 20%, of units derived from at least one other methacrylate ester, an acrylate ester, an unsaturated copolymerizable acid, glycidyl methacrylate, or a vinyl aromatic monomer. Further, the methacrylate polymer formed may contain up to 20% of units derived from a vinyl aromatic monomer, such as styrene and the like; a derivative of an $\alpha\beta$-unsaturated diacid, such as maleic anhydride, N-phenylmaleimide, and the like; (meth)acrylonitrile; or other $\alpha,\beta$-monounsaturated compounds which are known to copolymerize with (meth)acrylic esters. Preferred co-monomers at about the 5% level are ethyl acrylate, butyl acrylate, glycidyl methacrylate, acrylic acid and methacrylic acid. The units derived from the unsaturated copolymerizable acid may be at least partially converted to an ammonium, alkaline earth, alkali metal, or zinc salt prior to or during isolation.

The process is especially useful when the polyolefin is any of a variety of polyethylene substrates, such as conventional low-density polyethylene, high density polyethylene, linear low-density polyethylene, and includes ethylene copolymers with low levels of copolymerized a-olefins. It is further useful when the polyolefin is polypropylene, by which is meant polypropylene homopolymers, including both isotactic and syndiotactic polypropylene, and copolymers of polypropylene with other olefins, such as ethylene, which copolymers are non-rubbery, and especially when they are crystalline.

A preferred process, because of its ready adaptation to a variety of equipment and its ability reproducibly to produce segmented copolymers with good performance in modifying the sag properties of polypropylene or for use in compatibilization or tie layers between polar and non-polar polymers, is to prepare a segmented copolymer of a polyolefin with a (meth)acrylate monomer mix by charging the polyolefin, water, and dispersant to a stirred reactor, heating to a temperature between about 60° and about 115° C., preferably between about 75° and about 105° C., adding over about ½ hour the (meth)acrylate monomer, a co-solvent mixture of pentanol and heptane as low as about 5 wt. % of polyolefin charged, along with a free-radical initiator, further heating to above the softening point of the polyolefin, such as to about 145° C., over about a one-half hour period, feeding more monomer, solvent, and initiator over another 30 minute period, holding the reaction another 30 minutes, and cooling and separating the graft copolymer product.

The particulate polyolefins which are used in the present process are either flaked polymer, polymer pellets, or porous spherical polymers. Such are commercially available from several suppliers in various molecular weight and compositional versions. The up to 6 mm. particle length is that usually found from pelletized, extruded polymers, but similar pellets or chopped strands of slightly larger particle size may also be utilized. Rubbery polymer, such as EPDM, may have to be cooled with Dry Ice or the like prior to flaking or comminuting.

The solvents are inert or essentially inert to the free-radical polymerization process, and are volatile enough that they may be readily removed by steam-stripping or vacuum devolatilization of the polymer particles without the need for fusion and extruder devolatilization. The solvents preferably are not so low-boiling that they create unduly high pressures when a pressure vessel is used to accomplish the polymerization. They should be miscible with the monomer(s) to be polymerized, relatively water-insoluble so as to be separable from water for re- use and to be removed by steam-distillation. Such solvents include alkanes, such as heptane, hexane, octane, methylcyclohexane, and the like, aromatic hydrocarbons, such as benzene, toluene, or t-butylbenzene, aliphatic ketones, such as 2-methyl-3-hexanone, higher alcohols, that is, monohydric alcohols of 5 carbons and above, such as the various pentanols, hexanols, heptanols, and the like, and mixtures of such solvents.

Preferred for environmental reasons is a mixture of alkanes and aliphatic ketones or a mixture of higher alcohol and alkanes, such as heptane and pentanol, in a preferred ratio of from about 3:2 to about 2:3.

For good sag resistance of the segmented copolymer in modifying the melt strength of polypropylene, and for good conversion of monomer to polymer, it is preferred that the ratio of solvent to polyolefin be from about 30 parts to about 80 parts per 100 parts of polyolefin, and further that the ratio of monomers to polyolefin be from about 30 parts to about 100, more preferably 50 to 80 parts, per 100 parts of polyolefin. It is further preferred that the ratio of solvent(s) plus monomer(s) to polyolefin be between 60 to 180 parts per 100 parts of polyolefin.

Critical to the invention, unless one utilizes the process variant of forming a dispersant in situ during and after the first stage reaction, is the presence of a specific dispersing agent. Several are taught in the prior art for use in solvent-containing or solvent-free systems where there is a time period for establishing a swollen non-polymerizing particle stabilized in the aqueous system by the dispersant. Those taught for such use are expected to be ineffective in the present system where there is rapid heating of the slurry, with withholding of much or all of the solvent prior to monomer addition, and with rapid polymerization of the monomer, leading in general to agglomeration of particles and resulting in a partially fused mass which requires mechanical energy to break back to particulate size.

The effective dispersants found for this process are high molecular weight, i.e., above 100,000 and preferably above 1,000,000 in weight-average molecular weight, copolymers of units derived from (meth)acrylic esters and (meth)acrylic acid, where the (meth)acrylic esters are those of lower alkyl (meth)acrylates, such as ethyl acrylate, methyl methacrylate, butyl acrylate, and the like copolymerized with acrylic or methacrylic acid, the acids being at least partially neutralized. The dispersant may be slightly cross-linked. Preferred is a copolymer formed from about 35 parts ethyl acrylate and about 65 parts of methacrylic acid. Other conventional dispersants may also be present.

Adjustment of pH may be required to utilize the dispersant of choice most effectively, such as by attaining the most effective concentration of free acid and neutralized acid groups. Materials such as sodium dihydrogen phosphate, or mixtures with disodium monohydrogen phosphate, which aid in maintaining the pH of the aqueous medium at about 5, are found to be quite useful. It is further useful for control of dispersed polymer particle size to pre-activate the dispersant with a base such as sodium hydroxide to a pH of 6 to 7, wherein the dispersant is at least 50% neutralized, and then use the buffer system to bring the pH lower during the dispersion or slurry polymerization.

It will aid in retaining good dispersion of the slurry of the segmented copolymer to add a small amount of copolymerizable surfactant to the (meth)acrylate monomers to be polymerized. An effective amount will be from about 0.1 parts to about 5 parts, preferably 0.5 to about 5 parts, based on total monomer charged, and may be present in any or all of the various monomer charges. Such copolymerizable surfactant monomers should be related to anionic surfactants so as to be compatible with the dispersant used in the process, would contain a carbon-carbon double bond readily copolymerizable with a (meth)acrylate ester, and would include (as the sodium, potassium, or ammonium salt) allyl sulfonic acid, (meth)acryloxyethylsulfonic acid, p-vinylbenzenesulfonic acid, (meth)acryloxyethylmonosulfuric acid, and the like. Also included would be monomers which would furnish carboxylic acid salts or phosphorus-containing acid salts, such as the alkali metal salts of $\beta$-(meth)acryloxypropionate, monolauryl maleate, mono ($\beta$-(meth)acryloxyethyl) phosphate, and the like.

I also have found that even the above dispersants may be eliminated, with advantages in handling of stripping of solvent from the resulting dispersion, by eliminating any charging of dispersant or copolymerizable surfactant to the reactor, and instead charging a copolymerizable acid during the first monomer charge, then neutralizing that acid prior to (or during) raising the temperature for the second monomer addition. Specifically, I have found that when I utilize no dispersant or copolymerizable surfactant, that when I add from about 5 to about 120 parts of a first monomer mixture which is greater than 50% by weight of at least one alkyl (meth)acrylate, that mixture should contain from greater than 5 to 25% by weight of units derived from an unsaturated copolymerizable acid, which mixture is at least partially polymerized by continuing heating to maintain the reaction temperature at at least 60° C. for at least about 30 minutes, then neutralizing the units derived from an unsaturated polymerizable acid to convert the units at least partially to an ammonium or alkali metal salt, then concurrently or sequentially heating the reaction mixture to a temperature at least above 115° C. and above the softening point of the polyolefin particles and continuing the second monomer addition. Preferentially the copolymerized unsaturated acid is acrylic or methacrylic acid, although other acids, such as itaconic acid, maleic acid, fumaric acid, maleic anhydride, or $\beta$-acryloxypropionic acid may be used. The (meth)acrylate polymer formed may also contains up to about 20% of units derived from at least one other methacrylate ester, an acrylate ester, glycidyl methacrylate, or a vinyl aromatic monomer.

The invention also contemplates the use of several staged additions at various constant or ascending temperatures and various ratios of solvent and monomer, as long as the total monomer/solvent/polyolefin ratios are maintained. Thus is contemplated such possibilities as two additions at a temperature of 75° C., or an addition at 75° C., one at 115° C., and one at 145° C., or an addition at a temperature of 75° C., an addition at 145° C., followed by addition of a monomer feed of different content at 145° C., Solvent recovery can be accomplished most effectively by steam-distilling the slurry of water, solvent, and dispersed segmented copolymer. Relatively simple experimentation will establish conditions whereby the solvent may be removed without causing the polymer particles to agglomerate. The solvents after steam-distillation may be separated from the water and used in further polymerizations, if desired. Alternatively, the slurry can be filtered, and solvents remaining in the particles removed by conventional vacuum-drying processes.

Initiators for the polymerization are those known to the art for polymerizations within the temperature range encompassing 50° C. to 170° C., preferably 75° C. to 140° C. A few experiments will establish the conditions sufficient to prepare high molecular weight segments at a reasonable rate of polymerization. Because the temperature is not maintained at a constant level, it is difficult to calculate a radical flux as a guide to selection of amount of initiator. A preferred initiator is t-butyl perbenzoate, which has a one-hour half-life at 125° C. and a ten-hour half-life at 101° C. Other peroxides, peresters and peracids having somewhat similar one-hour half-life/temperature relationships, may also be used, such as: 2,5-dimethyl-2,5-dibenzyl peroxyhexane (138° C.), di-tert-butyl diperoxyphthalate (123° C.), methyl ethyl ketone peroxide (133° C.), dicumyl peroxide (135° C.) tert-butyl peroxycrotonate (118° C.), 2,2 bis-t-butyl(peroxybutane) (119° C.), t-butylperoxy isopropyl carbonate (119° C.), 2,5-dimethyl-2,5-bis(benzoylperoxy)-hexane (118° C.), t-butyl peracetate (120° C.), di-t-butyldiperoxy-phthalate (123° C.), and the like. The figures in parentheses are the 1 hr. half-life temperatures. Other useful initiators for lower temperature polymerizations include t-butyl peroxypivalate (74° C.), t-butyl peroctoate (95° C.), and 1,1-di(t-butylperoxy)-3,3,5-trimethylcyclohexane (112° C.).

Other initiators may also be employed in versions of this process where the temperature is varied, for example, 2,4-pentanedione peroxide (167° C.), Di-t-butyl peroxide (149° C.), 2,5-dimethyl-2,5-di(t-butylperoxy)-hexyne (149° C.), 2,5-dimethyl-2,5-di(t-butylperoxy)-hexene (149° C.), 2,5-dimethyl-2,5-di(t-butylperoxy) hexane (138° C.), and the like.

To the segmented copolymer may be added conventional additives such as thermal stabilizers, antioxidants, lubricants, dyes, pigments, fillers, impact modifiers, plasticizers, and the like. Especially useful are thermal stabilizers and antioxidants, such as disulfides, thioesters, phosphites, substituted phenols, and other well-known additives.

To predict the effect of the segmented copolymers on the thermoformability at low shear of polypropylene, the following improved "sag" test was devised. The polyolefin blends were compressions molded in an electrically heated Carver press 15×15 cm or Farrel press 30.5×30.5 cm. The samples were molded between stainless steel with an appropriate spacer to provide the required thickness (0.25 to 3.8 mm).

In one method the hot melt was taken directly from the mill roll and placed between two stainless steel sheets. This was then placed in the press set at 190° C. and pressed at high pressure (68–91 metric tons For the Farrel press and 6820 kg for the Carver press). After three minutes the mold was placed in an unheated press at high pressure for three minutes. In the other procedure, granulated material or pellets produced from an extrusion, Haake, or milling operation were dried and then compression molded. The procedure used was the same as for molding a melt except that a 5 minute preheat was used while maintaining a slight pressure on the press. This was followed by the high pressure molding in the hot and cold presses. A hot press of 190° C. was usually sufficient for mfr=4 polypropylenes, but higher viscosity polypropylenes would split during sag testing unless higher molding temperatures were used (195°–210° C.). The sag tests were performed on a compression molded sheet 10×10×0.15 cm. This sheet was clamped in a frame with a 7.6-cm-square opening. There were metal rulers attached to the front and back of the frame for use in measuring sag. The frame and sheet were placed in a hot, forced air oven (typically at 190° C.). The amount of sag of the center of the sheet was then recorded as a function of time. Typically, the sag was first recorded at 2.5 cm but for slow sagging materials sags as low as 16 mm were recorded. Data were recorded up to 10.2 cm of sag or for 30 minutes, whichever occurred first.

The term "slope" refers to the slope of a plot of the natural logarithm of the sag in centimeters versus time, resulting in a straight line. A high slope indicates that the material sags quickly while a low slope indicates that it sags slowly. The advantage of comparing slopes in this manner is that it eliminates any differences in oven cooling when the sample is introduced.

The polymers prepared by the process of the present invention are useful for the uses taught in the incorporated reference of Ilenda et al. The polypropylene//-methyl methacrylate segmented copolymers are useful in imparting melt strength and sag resistance to polypropylene and to other polyolefins, they may be used as processing aids for polypropylene, and as compatibilizers between polyolefins and polar polymers, as taught in Ilenda et al. The polyethylene//methyl methacrylate Segmented copolymers are also useful in reducing sag, and as serving as compatibilizers between polar polymers and polyethylene, including as adhesives

EXAMPLES

In these examples, the dispersant is a poly(ethyl acrylate/methacrylic acid 35/65 copolymer of MW ca. 2,000,000, ca. 50% neutralized with NaOH. The reactor is a three-liter pressure vessel equipped with stirrer, and means for adding liquids under pressure.

Example 1

This example relates to a two-stage polymerization process for the preparation of a high-density polyethylene (PE)//methyl methacrylate (MMA) segmented copolymer. Deionized water (1196.3 g initially, plus three 125 g rinses), high density polyethylene pellets(380 g), dispersant(190 g, 2% solids emulsion charged at 1 wt. % solids based on PE), and monosodium phosphate monohydrate (25.0 g, 6.585 wt. % based on PE) are charged to a pressure vessel. The pH of the reaction mixture is 5.31. The vessel is sealed and subjected to three vacuum/nitrogen purge cycles. Agitation is set at 250 RPM, and heating to 105° C. is begun, starting at an initial temperature of 19° C. A solution of t-butyl peroctoate (0.73 g, 0.619 wt. % based on Stage 1 MMA; 0.109 wt. % based on the sum of PE, toluene, and MMA charged to system by the end of Stage 1;10 hr half-life at 77° C.; 1 hr half-life at 95° C; wt. % active oxygen =7.39) in toluene (95 g, 25 wt. % based on PE) is Charged to the reactor during 4 minutes. During the four-minute interval, the temperature rises to 24° C. (P=38 psig).

The temperature of 105° C. desired for the first polymerization stage is reached in 32 minutes, and a 30 minute feed of Stage 1 monomer solution is begun immediately. The solution is comprised of MMA (114.0 g, 30 wt. % based on PE) dissolved in toluene (57 g, 50 wt. % based on Stage 1 MMA, 15 wt. % based on PE). The pressure rises to 80 psig (550 kPa) during the feed. The reaction mixture is held at 105° C. for an additional 30 minutes, followed by heating to 145° C. during 26 minutes. The pressure at 145° C. is 128 psig (880 kPa). A solution of polymerization stage 2 monomer MMA (152 g, 40 wt. % based on PE) in toluene (76 g, 50 wt. % based on MMA; 20 wt. % based on PE)is charged to the reactor during 7 minutes. The pressure at the end of the feed is 175 psig (1200 kPa). The reaction mixture is held 10 minutes, after which a solution of t-butyl peroxybenzoate (0.93 g, 0.600 wt. % based on Stage 2 MMA; 0.1 wt. % based on the sum of PE, toluene, and MMA charged to system by the end of Stage 2; 10 hr half-life at 105° C.; 1 hr half-life at 125° C.; active oxygen=8.07 wt. %) in toluene (38 g, 25 wt. % based on Stage 2 MMA, 10 wt. % based on PE) is charged during 4 minutes. The temperature is maintained at 145° C. for 30 minutes during which tinge the pressure drops from 180 to 163 psig (1240 to 1120 kPa). The reactor is then cooled to 25° C. and the contents are discharged.

The reaction product is dried at 60° C. with vacuum set at 25 mm Hg to give 643 g (99.5% isolated yield based on the sum of PE and MMA) of dry product having a bulk particle size (ca. 4 mm) slightly larger than the original pellets. The pH and % solids of the aqueous phase are 4.82 and 1.23, respectively.

The polymer will exhibit sag resistance when tested as an additive in polypropylene, and may be used to improve adherence of polar polymers to polyethylene.

Example 2

5 This example relates to a single-stage polymerization for a composition similar to that of Example 1. Deionized water (1352.8 g initially, plus one 125 g rinse), high density polyethylene (456.3 g, , pellets), dispersant (228.6 g, 2% solids emulsion charged at 1 wt. % solids based on PE), monosodium phosphate monohydrate (30.1 g, 6.585 wt. % based on PE), and toluene (228.6 g, 50 wt. % based on PE) are charged to a pressure vessel. The pH of the reaction mixture is 5.36. The vessel is sealed and subjected to three vacuum/nitrogen purge cycles. Agitation is set at 250 RPM, and heating to 125° C. is begun, starting at an initial temperature of 20° C.

The temperature of 125° C. desired for the first polymerization stage is reached in 47 minutes, and a 9 minute feed of polymerization stage 1 monomer solution is begun immediately. The solution is comprised of MMA (182.9 g, 40 wt. % based on PE) and 1,1-di(t-butylperoxy)3,3,5-trimethylcyclohexane (2.06 g, 10 hr half-life at 92° C.; 1 hr half-life at 112° C.; active oxygen=9.73 wt. %) dissolved in toluene (91.4 g, 50 wt. % based on Stage 1 MMA; 20 wt. % based on PE). The pressure rises to 99 psig (680 kPa) during the feed. The reaction mixture is held at 125° C for an additional 60 minutes, during which time the pressure remains constant. The reactor is then cooled to 25° C., and the contents are discharged.

The reaction product is dried at 60° C. with vacuum set at 25 mm Hg to give 617 g (96.5% isolated yield based on the sum of PE and MMA) of dry product having a bulk particle size equal to approximately 3 to 10 of the original polyethylene pellets. The pH and % solids of the aqueous phase are 5.20 and 1.70, respectively.

Examples 3-8

In these examples are reported variants of Example 1.

Example 3

Monomer feed in Stage 1 is extended to 30 minutes.

Example 4

Initiator/solvent "heel" are added simultaneously with the monomer/solvent feed.

Example 5

Initiator/solvent feed of Stage 2 is combined with monomer/solvent feed. (Note: for safety reasons—combination of initiator with uninhibited monomer in a feed tank—the feed tank and lines should be carefully monitored for preparations such as Examples 4 and 5.)

Example 6

The toluene is replaced with an equivalent weight of a heptane/n-pentanol 60:40 mixture.

Example 7

The changes of Examples 3, 4, and 5 are incorporated into the same experiment.

Example 8

The solvent amounts are lowered proportionately in both stages so the total solvent is 40% by weight of the polyethylene charged.

Examples 9-15

In this series are prepared a number of segmented polymers of conventional polyethylene onto which is polymerized MMA by use of a single-stage process at 145° C. The variables are initiator level and monomer feed time. The process of Example 2 is utilized, but with the following conditions:

| Polyethylene | conventional homopolymer |
|---|---|
| Type | One Stage at 145 C.; 300 RPM |
| Solids | 25% |
| MMA on Polyethylene | 40% |
| MMA of Total Polymer | 28.57% |
| Solvent Type | Toluene |
| Solvent Level Total | 55% on Polyethylene |
| Solvent on MMA Feed | 50% |

| Example | Initiator (% b.o. PE, MMA, tol.) | Feed Time (min.) | Mw | Mn |
|---|---|---|---|---|
| 9 | 0.05 | 10 | 84000 | 40000 |
| 10 | 0.55 | 10 | 13000 | 720 |
| 11 | 0.05 | 50 | 75000 | 38000 |
| 12 | 0.55 | 50 | 18000 | 880 |
| 13 | 0.30 | 30 | 31000 | 5600 |
| 14 | 0.30 | 30 | 29000 | 6800 |
| 15 | 0.30 | 30 | 30000 | 5600 |

Example 16

This example demonstrates the two-stage grafting process as applied to a starting polymer which is linear low-density polyethylene. In a manner similar to Example 1, utilizing a three-liter reactor, are charged 586.6 grams of water, 14.27 grams of sodium dihydrogen phosphate monohydrate in 100 grams water, the dispersant of the previous examples (a 2% solution, neutralized to ca. 50% by NaOH prior to addition), 650 grams of linear low-density polyethylene, and 270 grams of water from various rinses. The kettle is evacuated prior to heat-up and the beginning of feeds. The reactor is heated to 105° C. over a period of 45 minutes. A mixture of 123.5 grams methyl methacrylate, 6.5 grams of butyl acrylate, 39 grams heptane, 26 grams of pentanol, and 1.17 grams of t-butyl peroctoate (87% active) and 200 grams of a water rinse are added over a 30 minute period. The reactor is then directed heated to 145° C. over a 30minute period.

At 145° C. are added 247 grams methyl methacrylate, 13 grams butyl acrylate, 78 grams heptane, 53 grams pentanol, 1.53 grams of t-butyl perbenzoate, and 200 grams of rinse water over a 30 minute feed period. The slurry is held at 145° C. for 30 minutes longer, then a thermal stabilizer (tris(4-t-butyl-3-hydroxy-2,6-dimethylbenzyl)-s-triazine-2,4,6-(1H, 3H, 5H)-trione) and a commercial anti-foamer are added. The reaction is cooled to below 50° C., filtered, and the residual solvent and water removed under vacuum.

This preparation is conducted on a larger scale in a 187.5-liter reactor, with similar results.

Example 17

This example relates to a two-stage polymerization process for the preparation of a isotactic polypropylene homopolymer (PP)//methyl methacrylate (MMA) segmented copolymer. Deionized water (707 g initially, plus three 125 g rinses), polypropylene (mfr=4)(564 g), dispersant(282 g, 2% solids emulsion, 50% neutralized with NaOH, charged at 1 wt. % solids based on PP), and monosodium phosphate monohydrate (37.1 g, 6.59 wt. % based on PP) are charged to a pressure vessel, followed by 101.5 g. heptane, 67.6 grams pentanol and 0.08 g. of t-butyl peroctoate. The vessel is sealed and subjected to three vacuum/nitrogen purge cycles. Agitation is set at 250 RPM, and heating to 105° C. is begun, starting at an initial temperature of 19° C.

The temperature of 105° C. desired for the first polymerization stage is reached, and a 33 minute feed of Stage 1 monomer solution is begun immediately. The solution is comprised of MMA (112.8 g, 12.5 wt. % based on PP) dissolved in heptane (33.8 g.)/pentanol (22.55 g.). A 125 g. water rinse is used to flush the monomer feed lines. The pressure rises to 49 psig (338 kPa) during the feed. The reaction mixture is raised to 145° C. during 26 minutes. A solution of polymerization stage 2 monomer MMA (225.5 g, 25 wt. % based on PP) in 101.48 grams heptane/67.65 g. pentanol, along with 0.1 g. t-butyl perbenzoate, (a 125 g. water rinse follows) is charged to the reactor during 11 minutes. The pressure at the end of the feed is 175 psig (1200 kPa). The reaction mixture is held 30 minutes. The reactor is then cooled to 40° C. and the contents are discharged.

The reaction product is dried at 60° C. with vacuum set at 25 mm Hg to give 802 g of dry product. Very few fines were present in the product, and no strands of PMMA polymer. The molecular weight of extracted non-grafted poly(methyl methacrylate) for this and other samples described below is in excess of 50,000. When blended in polypropylene and tested by the sag test described above, there was no measurable sag after 30 minutes.

Examples 18–30

In these examples are shown some reaction variants of the process described in Example 17. For polymerizations carried out at 115°, 1,1-di(t-butylperoxy)-3,3,5-trimethylcyclohexane was employed as initiator. * began with 30 psig (207 mPa(gauge) pad;  t-BPB is t-butyl perbenzoate; t-BPO is t-butyl peroctoate. * single-stage reaction conducted at 145° C.

Some comments should be made on the tabulated data. "Single" (column next to final) refers to the appearance of the single particles; "good" refers to the acceptable appearance and flow of the resultant particles. "Agglom" (last column) is short for "Agglomerated particles"; "very few fibers" means that very few fibers of polymer were seen connecting the agglomerated material, and those were at the "top and bottom of the stirrer", where agglomeration is more likely to be seen." In Examples 19 and 22, the "***" indicates that the reaction was run as a single stage reaction, i.e., that all the monomer was charged at the temperature shown, then the reaction was heated to 145° C., and no further monomer was charged. These claims represent a single-stage monomer addition, not relating to the present invention. Although product which is a segmented polymer can be prepared by these Examples, the process is unacceptable for subsequent practical processing of the polymer.

"BOM" is "based on monomer", and "boPO" is "based on polyolefin". "Heel" refers to the amount to solvent present relative to polyolefin prior to initiation of monomer feed, i.e., present in the initial kettle charge of polyolefin, dispersant, water, and solvent.

TABLE I

Parameters Describing the Two-Stage Aqueous Slurry Reactions Using Polypropylene as Substrate for Grafting.

| Example | % solids | Stg1 % tBPO b.o. Stg1 Mon. | Stg1 % tBPO b.o. Mon., Solv., PP | Stg1 T, °C. | Stg2 % Mon b.o. PO | Stg2 Mon. feed time (min) | Stg2 % tBPB b.o. Stg2 Mon.** | Stg2 % tBPB b.o. Mon., Solv., PP** | Solv | Heel % Sol boPO | Stg1 % Sol boM |
|---|---|---|---|---|---|---|---|---|---|---|---|
| 18 | 25 | .90 | .11 | 105 | 40 | 7 | .58 | .10 | Tol. | 30 | 50 |
| 19 | 25 | 1.07 | .11 | 105 |  | *** | *** | *** | Tol. | 60 | 50 |
| 20 | 25 | .90 | .11 | 105 | 40 | 7 | .58 | .10 | Tol. | 30 | 50 |
| 21 | 25 | .68** | .09** | 115 | 40 | 7 | .58 | .10 | Tol | 30 | 50 |
| 22 | 25 | .81** | .10** | 115 |  | *** | *** | *** | Tol. | 30 | 50 |
| 23 | 35 | .90 | .13 | 105 | 40 | 7 | .59 | .12 | Tol. | 10 | 50 |
| 24 | 45 | .90 | .13 | 105 | 40 | 10 | .59 | .12 | Tol. | 10 | 50 |
| 25 | 35 | .90 | .13 | 105 | 40 | 10 | .59 | .12 | 3H/2P**** | 10 | 50 |
| 26 | 45 | .90 | .13 | 105 | 40 | 11 | .59 | .12 | 3H/2P | 10 | 50 |
| 27 | 35 | .90 | .11 | 105 | 40 | 10 | .59 | .10 | 3H/2P | 30 | 50 |
| 28 | 35 | .90 | .11 | 105 | 40 | 30 | .59 | .10 | 3H/2P | 30 | 50 |
| 29 | 35 | .90 | .11 | 105 | 40 | 30 | .59 | .11 | 3H/ | 30 | 50 |

TABLE I-continued

Parameters Describing the Two-Stage Aqueous Slurry Reactions Using Polypropylene as Substrate for Grafting.

| 30 | 40 | .90 | .11 | 105 | 40 | 30 | .59 | .11 | 2P 3H/ 3P | 30 | 50 |

| Example | % solids | Stg2 % Sol boM | Total % Sol boPO | Stg1 Pmax psig* | Stg2 Pmax psig* | Prod. Wt (g) | MMA Conv.* (%) b.o. Prod. Wt. | Single ? | Agglom ? |
|---|---|---|---|---|---|---|---|---|---|
| 18 | 25 | 75 | 70 | 52* | 159* | 541 | 57.2 | most; stacks | |
| 19 | 25 | | 70 | 72* | 128* | 551 | 20.8 | | one solid lump |
| 20 | 25 | 75 | 70 | 34 | 115 | 545 | 58.9 | most: stacks | |
| 21 | 25 | 75 | 70 | 65* | 161* | 545 | 58.9 | most | |
| 22 | 25 | | 40 | 68* | 120* | 578 | 46.3 | a few | one solid lump |
| 23 | 35 | 50 | 40 | 32 | 113 | 895 | 97.9 | most; stacks | |
| 24 | 45 | 50 | 40 | 35 | 120 | 1132 | 93.6 | most; stacks | |
| 25 | 35 | 50 | 40 | 35 | 127 | 886 | 102 | all, good | |
| 26 | 45 | 50 | 40 | 39 | 135 | | 92.0 | most, some packed bunches | very few fibers top and bottom stirrer only |
| 27 | 35 | 75 | 70 | 49 | 150 | 802 | 70.4 | | many threads; some silt |
| 28 | 35 | 75 | 70 | 41 | 114 | 817 | 74.8 | all; flat disks | |
| 29 | 35 | 50 | 60 | 44 | 127 | 781 | 64.2 | all; good | |
| 30 | 40 | 50 | 60 | 43 | 114 | 995 | 90.7 | all; some stacks | |

Example 31

This example relates to the use of EPDM as the polyolefin segment. Two EPDM polymers are studied, both believed to contain ethylidene norbornene as the "diene" monomer. EPDM-1 was "medium viscosity, crystalline" terpolymer, while EPDM-2 was "low viscosity, amorphous". The EPDM materials are cooled to −78° C. and shredded in a cold granulator to obtain particles. The polymerizations are carried out by a two-stage process similar to that described in Example 16 above, the first stage monomer charged being twenty percent of the total monomer charged. Toluene is the solvent. Below 40% monomer on polyolefin, there is discerned a tendency towards aggregation to large lumps, perhaps because the EPDM is soft and sticky at this temperature. The skilled artisan could lower the amount of solvent, vary the ratio of monomer in the two stages, or lower the polymerization temperature to avoid agglomeration.

Example 32

This example demonstrates the two-stage grafting process as applied to a starting polymer which is linear low-density polyethylene. In a manner similar to Example 1, utilizing a three-liter reactor, are charged 1080.59 grams of water, 10.51 grams of sodium dihydrogen phosphate monohydrate, 1.83 grams (solids basis) of the dispersant of the previous examples (a 2% solution, neutralized to ca. 50% by NaOH prior to addition), and 550 grams of linear low-density polyethylene. The kettle is evacuated prior to heat-up and the beginning of feeds. The reactor is heated to 105° C. over a period of 45 minutes. A mixture of 104.5 grams methyl methacrylate, 5.5 grams of butyl acrylate, 33 grams heptane, 22 grams of pentanol, and 0.09 grams of t-butyl peroctoate (87% active)and 120 grams of a water rinse are added over a 30 minute period. The reactor is then directly heated to 145° C. over a 30 minute period.

At 145° C. are added 209 grams methyl methacrylate, 11 grams butyl acrylate, 66 grams heptane, 44 grams pentanol, 1.29 grams of t-butyl perbenzoate, and 200 grams of rinse water over a 30 minute feed period. The slurry is held at 145° C. for 30 minutes longer, then two thermal stabilizers ((tris(4-t-butyl-3-hydroxy-2,6-dimethylbenzyl)-s-triazine-2,4,6- (1H, 3H, 5H)-trione), 1.76 grams and dilauryl thiodipropionate, 0.59 grams are added along with 14 grants of heptane and 9 grams of pentanol, and 200 grams of a water rinse. The reaction is cooled to below 50° C., filtered, and the residual solvent and water removed under vacuum.

In this preparation, the polyolefin is 62.5% of the final product, the polymethyacrylate produced in Stage I is 12.5%, and the polymethyacrylate produced in Stage II is 25%. The total solvent based on polyolefin is 30%, the effective solids is 41.7%

Example 33

This example illustrates preparation of the segmented copolymer containing the non-volatile solvent, hydrogenated soybean oil. In a manner similar to Example 32, utilizing a three-liter reactor, are charged 600 grams of water, 15 grams of sodium acetate, 15.38 grams of acetic acid, 2.5 grams (solids basis) of the dispersant of the previous examples (a 2% solution, neutralized to ca. 50% by NaOH prior to addition), and 500 grams of linear low-density polyethylene. The kettle is evacuated prior to heat-up and the beginning of feeds. The reactor is heated to 105° C. over a period of 45 minutes.

Separately, a mixture of 95 grams methyl methyacrylate, 5.5 grams of butyl acrylate, 50 grams of hydrogenated soybean oil (heated above 70° C. to liquefy), 50 grams of a 15% potassium oleate soap solution, and 300 grams of dilution water are mixed with vigorous stirring to form a stable emulsion. Just before addition to the reaction, 0.09 grams of t-butyl peroctiate (87% active) are added; 120 grams of a water rinse follows the addition of the monomer/hydrogenated soybean oil emulsion, which are added over a 30 minute period. The reactor is then directly heated to 145° C. over a 30 minute period.

At 145° C. are added a second pre-emulsified mix of 190 grams methyl methacrylate, 10 grams butyl acrylate, 100 grams of hydrogenated soybean oil, and 100 grams of 15% potassium oleate solution, and 600 grams of dilution water, with 1.29 grams of t-butyl perbenzoate added just prior to charging to the kettle, and 120 grams of rinse water following the 30 minute feed period.

The slurry is held at 145° C. for 30 minutes longer, then two thermal stabilizers ((tris(4-t-butyl-3-hydroxy-2,6-dimethylbenzyl)-s-triazine-2,4,6-(1H,3H, 5H)-trione), 1.76 grams and dilauryl thiodipropionate, 0.59 grams are added along with 14 grams of heptane and 9 grams of pentanol, and 200 grams of a water rinse. The reaction is cooled to below 50° C., filtered. No solvent strip is employed; the particles retain the shape and feel of particles from Example 17 or 32, and are useful for blending with polyolefins.

Example 34

The previous Example is repeated, but different means are employed to prevent the dispersant from precipitating, avoiding agglomeration, and converting the potassium oleate to oleic acid so the monomer and solvent can diffuse from the emulsion and diffuse into the polyolefin particles.

Acids were added to the kettle charge (there was phosphate salt in this phase). Sulfuric acid and phosphoric acid precipitated the dispersant and the oleic acid, and agglomeration was observed; lactic acid showed moderate and acetic acid only slight precipitation of the dispersant; both precipitated the oleic acid. When the sodium dihydrogen phosphate was replaced with a buffer system of 1.25 equivalents of acetic acid per sodium acetate/potassium oleate, the pH was maintained at ca. 4.75, and a good balance of retention of the dispersant and avoidance of aqueous phase polymerization of the monomer was obtained.

Example 35

The chemistry defined in Example 33 (non-volatile solvent) is applied to the process of Example 17. The resulting segmented copolymer containing hydrogenated soybean oil is effective as a sag reductant when tested in polypropylene.

Example 36–40

This example illustrates the formation of a dispersant in situ, and the need for exact control of acid levels. The process of Example 32 was used, except that no dispersant was present during the reaction and no sodium dihydrogen phosphate was present in the initial (heel) charge. The first charge of monomer contained different levels of acrylic or methyacrylic acid. At the conclusion of the polymerization at 105° C., one equivalent of dilute sodium hydroxide was added, and the process continued. Efficacy of the in-situ generated dispersant was judged by whether there was undesirable agglomeration of the pellets and whether the aqueous layer was clear or cloudy after the grafted polymer was removed. AA is acrylic acid, MAA is methacrylic acid.

| Description | Pellet | White Water |
|---|---|---|
| No Acid | Agglomeration | Clear |
| 5% AA | Agglomeration | Clear |
| 5% MAA | Agglomeration | Clear |
| 7.5% MAA | Remained fine | Clear |
| 12.5% MAA | Remained fine | Cloudy |
| 25% MAA | Remained fine | Very Cloudy |

I claim:

1. A process for preparing a segmented copolymer of a polyolefin and of a polymer comprised of greater than about 50 weight percent of units derived from at least one alkyl (meth)acrylate, comprising:
   a) preparing a slurry of about 100 parts of particles of polyolefin of average particle size below about 6 mm. with
      1. from about 100 to about 500 parts of water;
      2. from about 0.1 to about 5 parts of at least one dispersant, the at least one dispersant maintaining the polyolefin particles in particulate form, the at least one dispersant being chosen from polymers which are copolymers of units derived from (meth)acrylic esters and at least one of units derived from a partially or totally neutralized copolymerizable unsaturated acid;
   b) heating the slurry in a pressure vessel with agitation until a temperature of at least about 60° C., is obtained;
   c) prior to or during said heating adding to the slurry from about 0 to about 100 parts of one or more organic solvents, miscible with the later-added first monomer mixture;
   d) adding to the heated slurry either separately or in combination
      1. from about 5 to about 120 parts of a first monomer mixture which is greater than 50% by weight of at least one alkyl (meth)acrylate;
      2. from about 0.01 to about 2 parts of at least one polymerization initiator;
      3. one or more organic solvents, miscible with the first monomer mixture so that the total of solvent added in steps (c) and (d) is from about 5 to about 100 parts of solvent;
   e) continuing heating to maintain the reaction temperature at at least 60° C., for at least about 30 minutes;
   f) heating the reaction mixture to a temperature at least above 115° C. and above the softening point of the polyolefin particles;
   g) further adding to the reaction vessel
      1. from about 5 to about 200 parts of a second monomer mixture which is greater than 50% by weight of at least one alkyl (meth)acrylate;
      2. from about 5 to about 150 parts of at least one organic solvent, miscible with the second monomer mixture;

3. from about 0.01 to about 2 parts of at least one polymerization initiator;

h) holding the reaction vessel at a temperature above 115° C. and above the softening point of the polyolefin particles until essentially complete conversion of the monomers to polymer occurs, the polymer being formed being at least partially grafted to the polyolefin to form the segmented copolymer, the segmented copolymer remaining in particulate form.

2. The process of claim 1 wherein the polyolefin is predominately composed of units derived from propylene or ethylene or copolymers thereof.

3. The process of claim 1 wherein the segmented copolymer is a segmented copolymer of polypropylene or a copolymer which is mainly from units derived from polypropylene and of a polymer comprised of greater than about 80 weight percent of units derived from methyl methacrylate.

4. The process of claim 1 wherein the at least one dispersant is a partially neutralized copolymer of about 35 parts ethyl acrylate and about 65 parts of (meth)acrylic acid and of molecular-weight above 100,000.

5. The process of claim 1 wherein the first monomer mixture is polymerized at a temperature below the softening point of the polyolefin, followed by polymerization of the remaining monomer at a temperature above the softening point of the polyolefin.

6. The process of claim 2 wherein the polypropylene homopolymer or copolymer has a molecular-weight of from about 50,000 to about 1,000,000, and wherein the methyl methacrylate polymer has a molecular weight of from about 20,000 to about 200,000.

7. The process of claim 1 wherein the (meth)acrylate polymer formed contains up to about 50% of units derived front at least one other methyacrylate ester, an acrylate ester, an unsaturated copolymerizable acid, glycidyl methacrylate, or a vinyl aromatic monomer.

8. The process of claim 2 wherein the (meth)acrylate polymer formed contains up to about 20% of units derived front at least one other methacrylate ester, an acrylate ester, an unsaturated copolymerizable acid, glycidyl methacrylate, or a vinyl aromatic monomer.

9. The process of claim 8 wherein the unsaturated copolymerizable acid is methacrylic acid or acrylic acid.

10. The process of claim 8 wherein further the units derived from the unsaturated copolymerizable acid are at least partially converted to an ammonium, alkaline earth, alkali metal, or zinc salt prior to or during isolation.

11. The process of claim 1 wherein the first and/or second monomer mixture further contains from about 0.1 to about 5 parts of a copolymerizable surfactant.

12. The process of claim 1, further comprising in any order:
i) separating the solvent from the particulate segmented copolymer particles;
ii) separating any remaining water from the particulate segmented copolymer particles.

13. The process of claim 1 or claim 10 wherein the solvent is not separated from the particulate segmented copolymer particles during or after separation from the water.

14. The process of claim 13, wherein the solvent is glycerol monostearate, oleic acid or hydrogenated soybean oil.

15. The process of claim 9 wherein the methacrylic acid or acrylic acid is present only in step (d)(1).

* * * * *